United States Patent [19]

Norling

[11] Patent Number: 4,891,982
[45] Date of Patent: * Jan. 9, 1990

[54] TEMPERATURE COMPENSATION OF A STEADY-STATE ACCELEROMETER

[75] Inventor: Brian L. Norling, Mill Creek, Wash.

[73] Assignee: Sundstrand Data Control, Inc., Redmond, Wash.

[*] Notice: The portion of the term of this patent subsequent to Jun. 14, 2005 has been disclaimed.

[21] Appl. No.: 205,194

[22] Filed: Jun. 10, 1988

Related U.S. Application Data

[63] Continuation-in-part of Ser. No. 879,262, Jun. 27, 1986, Pat. No. 4,750,363.

[51] Int. Cl.⁴ .............................................. G01P 15/08
[52] U.S. Cl. .................................. 73/497; 73/517 R; 73/517 AV
[58] Field of Search .............. 73/497, 517 R, 517 AV; 310/329, 346

[56] References Cited

U.S. PATENT DOCUMENTS 4,750,363 6/1988 Norling ................................. 73/497

FOREIGN PATENT DOCUMENTS 3038660 5/1982 Fed. Rep. of Germany .... 73/517 R

Primary Examiner—John Chapman
Attorney, Agent, or Firm—Michael S. Yatsko; Trevor B. Joike

[57] ABSTRACT

Prior steady-state accelerometers are subject to errors caused by differential thermal expansion between the force transducers and other accelerometer components. This problem is overcome by the present accelerometer that comprises a housing (32), a proof mass (30), a support (34,36) for mounting the proof mass with respect to the housing, and first and second force sensing elements (38,40). The force sensing elements have DC frequency responses, and are connected between the proof mass and the housing such that differential thermal expansion or contraction between the force sensing elements and the proof mass, support and housing results in rotation of the proof mass about a compensation axis (CA) normal to the sensitive axis (SA). The force sensing elements may extend from their respective points of connection to the proof mass in opposite directions parallel to the sensitive axis to their respective points of connection to the housing, and the force sensing elements may be connected to the proof mass at spaced-apart positions on opposite sides of the compensation axis.

12 Claims, 3 Drawing Sheets

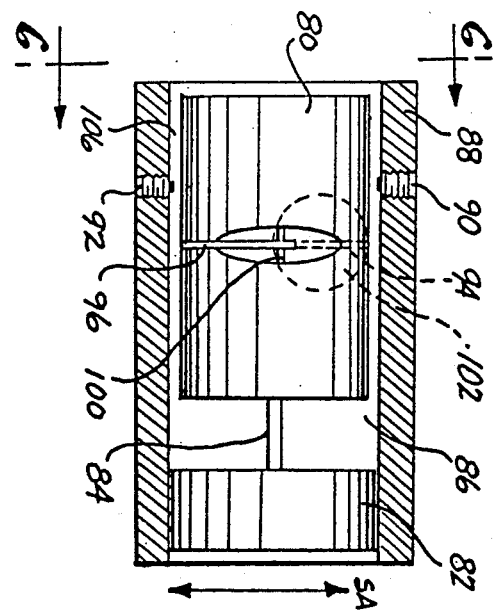
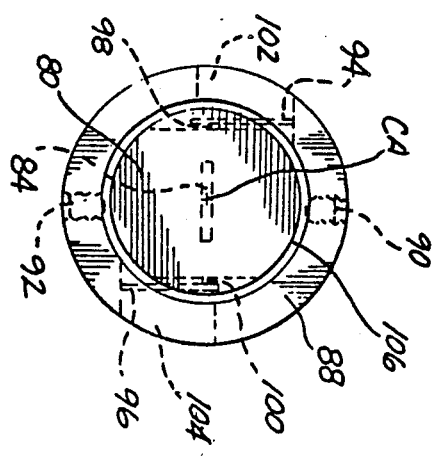

TEMPERATURE COMPENSATION OF A STEADY-STATE ACCELEROMETER

CROSS REFERENCE TO RELATED APPLICATIONS

This application is a continuation in-part of U.S. patent application Ser. No. 879,262, filed June 27, 1986, entitled TEMPERATURE COMPENSATION OF AN ACCELEROMETER, now U.S. Pat. No. 4,750,363.

TECHNICAL FIELD

The present invention relates to accelerometers for measuring absolute acceleration, and, in particular, to an accelerometer in which movement of a proof mass is constrained by a force transducer.

BACKGROUND OF THE INVENTION

In one type of prior accelerometer, a proof mass is mounted to a housing by a flexure hinge, and a force transducer is connected along the accelerometer's sensitive axis between the proof mass and the housing. An acceleration along the sensitive axis results in a compression or tension force on the force transducer. This force is converted into an electrical signal that indicates both the direction and magnitude of the acceleration. The force transducer has a DC and low frequency response, so that the accelerometer is capable of measuring absolute acceleration. Such accelerometers are sometimes referred to as "steady-state" accelerometers, in contrast to "dynamic" accelerometers (e.g., shock and vibration sensors) that typically do not respond to acceleration that changes at a rate less than about 5 Hz. Steady-state accelerometers may be used in navigation, borehole, gravity sensing and related applications in which the measurement of absolute acceleration is required.

In an accelerometer of the type described above, the coefficient of thermal expansion of the force transducer in general cannot be precisely matched by the coefficient of thermal expansion of the proof mass and housing. As a result, the proof mass moves relative to the housing as the temperature changes. This thermally induced movement has a number of adverse effects on the operation of the accelerometer. The flexure hinge resists the thermally induced movement and thereby causes a change in the bias of the instrument. A change in the axis alignment of the accelerometer also occurs as the thermally induced movement causes the position of the center of gravity of the proof mass to change relative to the housing. In addition, the thermally induced movement results in changes in the damping gap and the shock gap clearances between the proof mass and housing, thereby modifying the damping and limiting functions respectively of these components.

SUMMARY OF THE INVENTION

The present invention provides a steady-state accelerometer in which the movement of a proof mass is constrained by two force transducers, the force transducers being arranged such that errors due to temperature changes are significantly reduced in comparison to prior accelerometers.

In one preferred embodiment, the accelerometer comprises a housing, a proof mass, support means for mounting the proof mass with respect to the housing, and first and second force transducers. Each force transducer has a DC frequency response, i.e., a steady state input acceleration produces a steady state output and the force transducers are connected between the proof mass and housing such that differential thermal expansion or contraction between the force transducers and the other accelerometer components results in rotation of the proof mass about a compensation axis normal to the sensitive axis. In one preferred embodiment, the force transducers extend in opposite directions parallel to the sensitive axis from their respective points of connection to the proof mass to their respective points of connection to the housing, and the force transducers are connected to the proof mass at spaced-apart positions on opposite sides of the compensation axis.

BRIEF DESCRIPTION OF THE DRAWINGS

FIG. 5 is a cross-sectional view of a second embodiment of the accelerometer of the present invention;

FIG. 6 is a cross-sectional view taken along the line 6—6 of FIG. 5;

FIG. 7 is a cross-sectional view of a third embodiment of the accelerometer of the present invention; and FIG. 8 is a cross-sectional view taken along line 8—8 of FIG. 7.

DETAILED DESCRIPTION OF THE INVENTION

Figure 1:
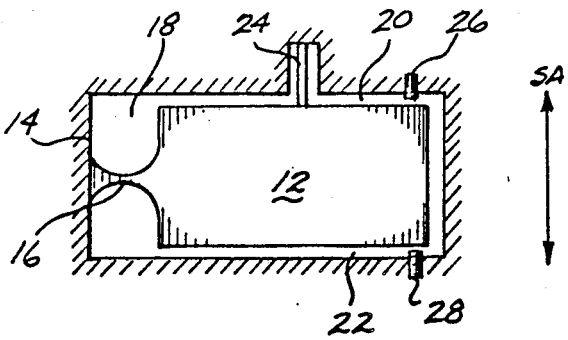
FIG. 1 is a cross-sectional view of a prior art accelerometer.

FIG. 1 illustrates a prior art steady-state accelerometer related to the accelerometer of the present invention. The accelerometer of FIG. 1 comprises proof mass 12 suspended from housing 14 by flexure hinge 16, and a force transducer comprising force sensing element 24 connected between the proof mass and housing. The force sensing element has a DC response, so that the accelerometer can be used for navigation, borehole, gravity sensing and similar applications in which absolute acceleration must be measured. The proof mass, housing and flexure hinge may all be fabricated from a metal such as beryllium copper. Proof mass 12 is generally rectangular in shape, and occupies a similarly shaped but slightly larger cavity 18 within housing 14. Flexure hinge 16 is adapted to permit movement of proof mass 12 upward and downward along sensitive axis SA, but to prevent significant movement of the proof mass in directions normal to the sensitive axis.

Damping gaps 20 and 22 between housing 14 and the upper and lower surfaces respectively of proof mass 12 serve to damp unwanted vibrations of the proof mass by providing a limited path for the movement of air as the proof mass moves. The width of damping gaps 20 and 22, and the widths of the corresponding damping gaps of the other figures, are exaggerated for the purpose of illustration. The accelerometer of FIG. 1 also includes shock stops 26 and 28 extending from housing 14 above and below proof mass 12 respectively. The shock stops limit the motion of the proof mass along sensitive axis SA, and thereby prevent damage to force sensing element 24 that might otherwise be produced by large (out of range) accelerations.

It is generally very difficult to match the coefficient of thermal expansion of force sensing element 24 to the coefficients of thermal expansion of the proof mass, housing and flexure hinge. A change in temperature of the accelerometer, therefore, results in movement of proof mass 12 along sensitive axis SA, which movement is resisted by flexure hinge 16. As a result, a force is exerted on force sensing element 24 in the absence of, or in addition to, any forces that may occur due to accelerations. Because the force transducer has a DC response, the slowly varying temperature signal cannot be separated from the acceleration signal, and there is therefore a temperature-dependent bias error in the output of the accelerometer. Temperature induced movement of the proof mass also causes a change in the alignment of the sensitive axis and a change in the shock stop clearances.

Figure 2:
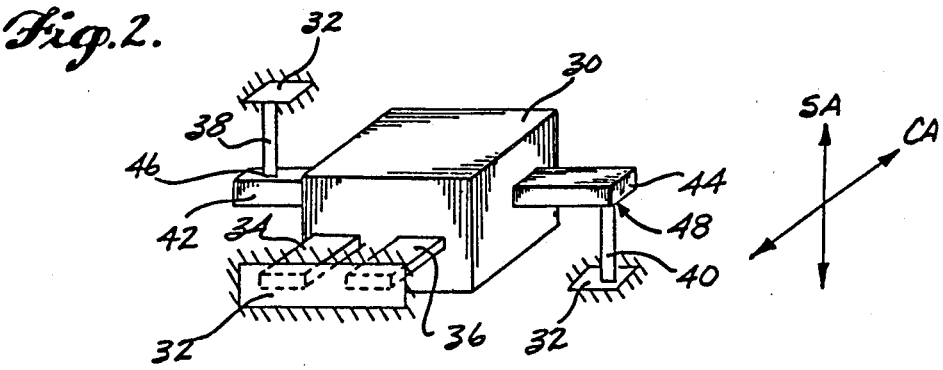
FIG. 2 is a conceptual view illustrating the principle of operation of the accelerometer of the present invention.

FIG. 2 presents a conceptual, schematic illustration of the accelerometer of the present invention. The accelerometer comprises proof mass 30 mounted to housing 32 by flexure hinges 34 and 36. Proof mass 30 includes members 42 and 44 extending laterally in opposite directions from the body of the proof mass. Members 42 and 44 are included in FIG. 2 primarily for purposes of illustration, and in many cases accelerometers of the present invention will not include corresponding structural elements.

Force sensing elements 38 and 40 are respectively connected to arms 42 and 44 at connection points 46 and 48, and extend in opposite directions from their respective connection points along sensitive axis SA to housing 32. As with the accelerometer of FIG. 1, flexure hinges 34 and 36 permit motion of proof mass 30 upwards and downwards along sensitive axis SA. However, flexure hinges 34 and 36 are also adapted to permit a limited amount of rotation of the proof mass about compensation axis CA, compensation axis CA being perpendicular to sensitive axis SA and also perpendicular to a line that extends perpendicular to axis SA between connection points 46 and 48. The most appropriate flexure hinge design will depend upon the application for which the accelerometer is intended. For example, the two-beam approach schematically illustrated in FIG. 2 would be appropriate for an accelerometer that would be subjected to large lateral forces normal to the SA and CA axes. However, a single, centrally positioned flexure hinge could be employed in an accelerometer that would not be subjected to high lateral loads.

Force sensing elements 38 and 40 must meet three basic requirements. First, the force sensing elements must be relatively stiff along sensitive axis SA, to provide rigid support for the proof mass. Such rigid support is needed to provide the accelerometer with a suitable high frequency response, and to minimize cross coupling errors. Second, the force sensing elements must have stable lengths, to avoid performance errors in bias due to wind-up in the flexures, and also to avoid errors in axis alignment of the sensitive axis of the accelerometer. However length changes that are roughly equal and highly repeatable in both force sensing elements are acceptable, because of the compensation provided by the present invention. Third, the force sensing elements and the transducers of which they are a part must have a frequency response down to and including DC, to enable the accelerometer to measure absolute acceleration.

In a preferred embodiment, each force sensing element 24 comprises a quartz crystal having double-ended tuning fork construction illustrated in U.S. Pat. No. 4,215,570. Such a crystal, in combination with a suitable drive circuit, comprises a vibrating beam force transducer having a resonant frequency that is a function of the axial force along the quartz crystal, i.e., along force sensing element 24. In particular, a compression force along the force sensing element produces a decrease in the resonant frequency of the force transducer, and a tension force exerted along the force sensing element results in an increase in the resonant frequency of the force transducer. Therefore, by connecting the force transducer output signal to a suitable frequency measurement circuit, the force exerted on force sensing element 24 by accelerations of proof mass 12 can be determined. The force sensing element could also comprise single and multiple (i.e., greater than two) tine arrangements, and the force sensing elements can be fabricated from materials other than crystal and quartz. However in general, the described dual tine quartz transducers are most suitable, given the current state of the art relating to such transducers.

Other suitable force sensing elements and force transducers include surface acoustic wave transducers, strain gauges, fiber-optic transducers, and resonant cavity stain sensors. A surface acoustic wave transducer comprises an elastic body on which are fabricated one or more sets of electrodes capable of both generating and detecting surface acoustic waves, known also as Lamb waves. The elastic body may comprise any stable low loss material, such as barium titanate, quartz, lead zirconate-titanate, silicon, etc. Piezoelectric behavior makes implementation simpler in some respects, but is not essential. Stress, induced by an external force, alters the propagation velocity of the surface acoustic waves, and produces a detectable change in output by one of several mechanisms, generally related to either a change in phase between a launched and detected wave, or a change in the resonant frequency corresponding to a particular standing wave pattern. The latter mode of operation closely resembles that of a vibrating beam transducer. Surface acoustic wave transducers have the capability to meet all of the aforementioned criteria, and can be fabricated as very small devices that draw very little current.

A strain gauge is a semiconductor device having a resistance that changes with strain. For conventional wire or foil type strain gauges, one or more (e.g. four) strain gauges may be mounted on a rigid, stable elastic member that extends between the proof mass and the housing. The strain gauges can be interconnected in a bridge circuit, or in other well-known arrangements. With certain semiconductor type strain gauges, the strain sensitive material can also serve as the structural element, thereby maximizing scale factor sensitivity. Strain gauges are ideal for obtaining DC response, but the current state of the art for accuracy is generally limited to about 0.1% of full scale.

The optical properties of a fiber-optic cable are sensitive to strain. For example, the optical path length of a particular section of fiber-optic cable is a function of the axial force exerted along the fiber-optic cable. Thus such a cable can form one arm of an interferometer, to provide a very accurate force sensor. Alternately, a pair of fiber-optic cables forming both arms of an interferometer could be operated in a push-pull mode. The birefringent properties of the fiber can also be used to detect strain through the measurement of the change in polarization of light passing through the fiber. In another optical arrangement, a fiber-optic cable is wound about a coil form, and axial forces applied to the coil cause a change in the optical path length of the fiber-optic cable.

Another suitable family of sensor utilizes a chamber in which acoustic or electromagnetic waves resonate at a frequency controlled by the geometry of the chamber. This chamber is coupled to the force (to be sensed) such that the force modifies the chamber geometry and causes a shift in the resonant frequency. The change in frequency forms the output signal. The chamber can be designed to provide a rigid or compliant suspension, and the rigidity of the constraint is an important consideration for the present invention. In general, the rigid constraint would lead to greater bias errors and a lower force sensitivity for a given size. However, it may allow the resonant chamber to be much smaller. An example of a resonant chamber accelerometer is the so-called "superconducting-cavity" accelerometer in which a microwave oscillator is stabilized by a superconducting cavity resonator.

In the accelerometer of FIG. 2, an acceleration along sensitive axis SA will result in a compression force on one force sensing element and a tension force on the other force sensing element. In the preferred embodiment in which each force sensing element comprises a portion of a vibrating beam force transducer, the result will be that the output signal frequency of one force transducer will decrease, and the output signal frequency of one force transducer will increase. The acceleration may then be determined by means of a relationship such as:

$$a = A_1 f_1 - A_2 f_2 + A_0 \tag{1}$$

where $f_1$ and $f_2$ are the output signal frequencies of the two force transducers, and where $A_1$, $A_2$ and $A_0$ are constants determined through calibration procedures. More complex relationships between output signal frequencies and acceleration may also be used. In equation (1), constants $A_1$ and $A_2$ represent the sensitivities of the respective force transducers, and constant $A_0$ represents the bias or offset of the accelerometer. Since the force transducers are preferably as similar as possible to one another, constants $A_1$ and $A_2$ are typically nearly equal to one another. Suitable systems for determining acceleration according to equation (1) are set forth in U.S. Pat. No. 4,467,651.

When the accelerometer of FIG. 2 is subjected to temperature changes, differential thermal expansion or contraction between the force sensing elements and the proof mass, flexure hinge and housing will result in force that will tend to rotate proof mass 30 about compensation axis CA. For example, if the thermal expansion of the force sensing elements is proportionally greater than the thermal expansion of the other components of the accelerometer, then force sensing element 38 will exert a downward force on member 42 and force sensing element 40 will exert an upward force on member 44. These forces will combine to rotate the proof mass in a counterclockwise direction, as viewed in FIG. 2, around compensation axis CA. Flexure hinges 34 and 36 will resist such rotation, resulting in equal and opposite compression forces on both force sensing elements. As a result, the temperature change will cause the output signal frequencies of the transducers associated with the force sensing elements to be reduced by approximately equal amounts. Referring to equation (1) above, the frequency changes caused by the thermal expansion will tend to cancel, and as a result the differential thermal expansion will not cause significant errors in the measured acceleration.

Force sensing elements 38 and 40 are preferably attached to the proof mass at positions that are spaced a substantial distance from one another, as illustrated in FIG. 2, in order to reduce the amount of rotation of the proof mass about compensation axis CA caused by a given differential thermal expansion or contraction. Connection points 46 and 48 are also preferably selected such that, for a given temperature change, the quotient of the length change of the force sensing element divided by the distance between compensation axis CA and the connection point for the force sensing element is the same as the corresponding quotient for the other force sensing element. By making such quotients identical, the only movement caused by differential thermal expansion or contraction is rotation about the compensation axis that does not affect the alignment of the sensitive axis. Equality of the quotients can readily be achieved by making the force sensing elements identical to one another and by making the distances to the connection points equal. However, in some applications, it may be desirable to use force sensing elements having different lengths and different distances of their connection points from the compensation axis to prevent or minimize cross talk between the force sensing elements. The above analysis may be generalized by defining a thermal expansion coefficient equal to the change in position of the force transducer or force sensing element at its connection points divided by the temperature change that caused the position change. In this formulation, the quotient that is preferably kept constant between the force transducers or force sensing elements is the thermal expansion coefficient divided by the distance between the force transducer connection point and compensation axis CA.

A further consideration relating to the relative positions of the force sensing elements has to do with the stiffness of such elements. The stiffness of a force sensing element is equal to the force applied to the force sensing element along the sensitive axis divided by the resulting change of length of the force sensing element. Preferably, the produce of the stiffness of each force sensing element multiplied by the distance between the center of mass of the proof mass and the connection point of the force sensing element is the same for both force sensing elements. If such products are not the same, then the proof mass will tend to rotate in response to an acceleration along the sensitive axis, creating a cross coupling term that can introduce errors in the accelerometer output. For most applications, it will be desirable to locate the center of gravity of the proof mass along compensation axis CA. The reason for this preference is that the center of mass should be aligned with the shock stops in order to maximize the effectiveness of such shock stops. Furthermore, the shock stops should be positioned in the plane defined by sensitive axis SA and compensation axis CA, so that they will be as close as possible to the center of rotation about compensation axis CA. As a result, in a preferred arrangement, the center of gravity of the proof mass will lie along the compensation axis.

Figure 3:
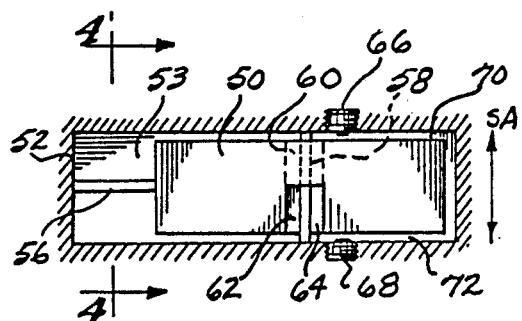
FIG. 3 is a cross-sectional view of one embodiment of the accelerometer of the present invention.
Figure 4:
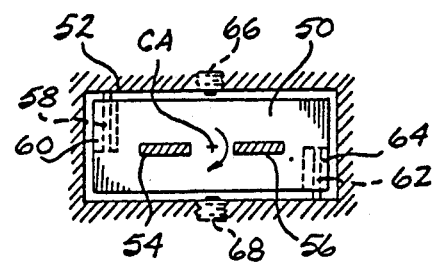
FIG. 4 is a cross-sectional view taken along the line 4—4 of FIG. 3.

FIGS. 3 and 4 illustrated a preferred embodiment of an accelerometer corresponding to the conceptual view of FIG. 2. The accelerometer of FIGS. 3 and 4 includes proof mass 50 suspended from housing 52 by flexure hinges 54 and 56. The flexure hinges permit motion of proof mass 50 upward and downward along sensitive axis SA, and also permit limited rotation of the proof mass about compensation axis CA. Proof mass 50 has a rectangular shape, and is suspended by the flexure hinges within a similarly shaped but slightly larger cavity 53 within housing 52. Damping gaps 70 and 72 are provided between housing 52 and the upper and lower surfaces respectively of the proof mass. The upper and lower surfaces of the proof mass include recesses 60 and 64 respectively, recesses 60 and 64 being located on opposite sides of the proof mass as viewed in FIG. 4. Force sensing element 58 is attached at one of its ends to housing 52, and is attached at its other end to proof mass 50 at the bottom of recess 60. In a similar manner, force sensing element 62 is attached at one of its ends to housing 52, and is attached at its other end to proof mass 50 at the top of recess 64. The accelerometer of FIGS. 3 and 4 also includes shock stops 66 and 68 that extend downward and upward respectively into cavity 53 and limit motion of the proof mass along sensitive axis SA.

The operation of the accelerometer of FIGS. 3 and 4 is similar to the operation described with respect to FIG. 2. Acceleration along sensitive axis SA results in a compensation force on one force sensing element and a tension force on the other force sensing element. As a result, the transducers associated with the respective force sensing elements shift the frequencies of their output signals in opposite directions, and the acceleration may be determined as per equation (1) above. Differential thermal expansion or contraction of the force sensing elements with respect to the other accelerometer components results in rotation of proof mass 50 about compensation axis CA, as indicated by the arrow in FIG. 3. Resistance of this rotation by the flexure hinges produces similar frequency shifts in the output signals of the force transducers, which frequency shifts tend to cancel when the frequencies are substracted as in equation (1). The shock stop clearances are unchanged by this thermally induced rotation.

A second preferred embodiment of the accelerometer of the present invention is illustrated in FIGS. 5 and 6. In this embodiment, cylindrical proof mass 80 is suspended from support 82 by flexure hinge 84, such that the proof mass is contained within cylindrical cavity 86 within housing 88. Support 82 is press fit within housing 88 such that the support is not free to move with respect to the housing. Flexure hinge 84 permits movement of proof mass 80 upward and downward along sensitive axis SA, and also permits limited rotation of the proof mass about compensation axis CA (FIG. 6), compensation axis CA corresponding to the central cylindrical axis of proof mass 80. The upward and downward motion of proof mass 80 is limited by shock stops 90 and 92, respectively.

Force sensitive elements 94 and 96 are connected between housing 88 and tabs 98 and 100 respectively extending from the sides of proof mass 80. The force sensing elements are positioned partially within cylindrical openings 102 and 104 that extend through the sides of housing 88 and that provide means for mounting the force sensing elements. The operation of the accelerometer of FIGS. 5 and 6 is similar to the operation of the accelerometer of FIGS. 2-4. However, the accelerometer of FIGS. 5 and 6 has the further advantage that the width of damping gap 106 between proof mass 80 and housing 88 does not change as the temperature varies. Referring to FIGS. 3 and 4, it will be appreciated that as proof mass 50 rotates about compensation axis CA in response to temperature changes, the widths of damping gaps 70 and 72 will vary along the width of proof mass 50. In contrast, in the accelerometer of FIGS. 5 and 6, the cylindrical shapes of proof mass 80 and cavity 86 results in an accelerometer in which no variation in the damping gap occurs as the temperature changes.

A third preferred embodiment of the accelerometer of the present invention is illustrated in FIGS. 7 and 8. This embodiment includes proof mass 110 that is suspended from frame 112 by flexure 114. Frame 112 is in turn suspended from housing 116 by pivotal elements 118, such as pivot bearings or flexures, such that the frame and proof mass are rotatable about an axis defined by the pivotal elements. Proof mass 110 includes cavities 120 and 122 formed on opposite sides and on opposite surfaces of the proof mass. Force sensing element 124 extends between proof mass 110 in cavity 120 and housing 116. In a similar manner, force sensing element 126 extends in an opposite direction from proof mass 110 in cavity 122 to housing 116.

The sensitive axis of the accelerometer of FIGS. 7 and 8 extends out of the plane of the paper in FIG. 7, while compensation axis CA extends through the frame and proof mass along the pivot axis defined by pivotal elements 118. The accelerometer is preferably constructed such that its center of mass lies along compensation axis CA. Therefore, in response to an acceleration along the sensitive axis, pivotal elements 118 support frame 112 against translational movement along the sensitive axis, while movement of proof mass 110 with respect to frame 112 is sensed by force sensing crystals 124 and 126 in a manner identical to that of prior embodiments. In response to a temperature change that changes the length of force sensing crystals 124 and 126 to a different degree than the other accelerometer components, the frame and proof mass rotate about compensation axis CA. To the extent that this rotation is resisted by pivotal elements 118, the result will be that force sensing crystals 124 and 126 are loaded equally, and the resulting frequency changes will cancel when the frequency difference is determined.

The construction of the accelerometer of the present invention reduces many of the sources of error associated with prior accelerometers. The reduction of errors due to temperature changes has already been described. The use of two vibrating beam force transducers also eliminates or reduces other common mode sources of error, such as errors due to drift in the time base provided by clock generator 124, errors caused by cross-axis accelerations, and vibration rectification errors that occur when the accelerometer is subjected to an oscillating input having a period shorter than the period for measuring the force transducer frequencies.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive propery or privilege is claimed are defined as follows:

1. An accelerometer for measuring acceleration along a sensitive axis, the accelerometer comprising a housing, a proof mass, support means for mounting the proof with respect to the housing, and first and second force transducers each of which has a DC frequency response, each force transducer being connected between the proof mass and the housing such that an acceleration along the sensitive axis results in a compression force on one force transducer and a tension force on the other force transducer and such that differential thermal expansion or contraction between the force transducers and the other accelerometer components results in rotation of the proof mass about a compensation axis normal to the sensitive axis.

2. The accelerometer of claim 1, wherein the force transducers are connected to the proof mass at respective connection points and extend from their respective connection points in opposite directions parallel to the sensitive axis.

3. The accelerometer of claim 2, wherein the connection points are located at spaced-apart positions on opposite side of the compensation axis.

4. The accelerometer of claim 3, wherein each force transducer is characterized by a thermal expansion coefficient such that for a given temperature change, the thermal expansion coefficient is equal to the change in position of the force transducer at the connection point divided by the temperature change, and wherein for each force transducer, the quotient of the thermal expansion coefficient divided by the distance between the force transducer's connection point and the compensation axis is equal to the same quotient for the other force transducer.

5. The accelerometer of claim 4, wherein the length of the first force transducer is different from the length of the second force transducer.

6. The accelerometer of claim 3, wherein each force transducer is characterized by a stiffness, such that for a given force exerted on the force transducer along the sensitive axis, the stiffness is equal to the magnitude of the force divided by the resulting change of length of the force transducer, and wherein the product of the stiffness of each force transducer multiplied by the distance between the force transducer's connection point and the compensation axis is equal to the same product for the other force transducer.

7. The accelerometer of claim 1, wherein the support means comprises flexure means attached between the proof mass and the housing, the flexure means permitting rotation of the proof mass with respect to the housing about a hinge axis normal to the sensitive axis and to the compensation axis.

8. The accelerometer of claim 7, wherein the force transducers are connected to the proof mass at respective connection points and extend from their respective connection points in opposite directions parallel to the sensitive axis, the connection points being located at spaced-apart positions on opposite sides of the compensation axis.

9. The accelerometer of claim 8, wherein the proof mass is rectangular in shape, one dimension of the proof mass being parallel to the sensitive axis and another dimension of the proof mass being parallel to the compensation axis.

10. The accelerometer of claim 8, wherein the proof mass is cylindrical in shape, the axis of the cylindrical proof mass coinciding with the compensation axis.

11. The accelerometer of claim 1, wherein the support means comprises a frame pivotally mounted in the housing for rotation about the compensation axis, and flexure means extending between the proof mass and the frame, the flexure means permitting rotation of the proof mass with respect to the frame about a hinge axis normal to the sensitive axis and to the compensation axis.

12. The acceleration of claim 11, wherein the force transducers are connected to the proof mass at respective connection points and extend from their respective connection points in opposite directions parallel to the sensitive axis, the connection points being located at spaced apart positions on opposite sides of the compensation axis.

* * * * *